(12) United States Patent
Miyata et al.

(10) Patent No.: US 7,019,938 B2
(45) Date of Patent: Mar. 28, 2006

(54) HEAD POSITIONING METHOD, AND DISK APPARATUS USING THE SAME

(75) Inventors: Keizo Miyata, Kyoto (JP); Toshio Inaji, Osaka (JP); Hiroshi Kohso, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 143 days.

(21) Appl. No.: 10/692,652

(22) Filed: Oct. 27, 2003

(65) Prior Publication Data

US 2004/0080862 A1   Apr. 29, 2004

(30) Foreign Application Priority Data

Oct. 28, 2002   (JP) ............... 2002-312443

(51) Int. Cl.
   *G11B 5/596*   (2006.01)
(52) U.S. Cl. .............. 360/78.05; 360/77.04
(58) Field of Classification Search ............ 360/78.05, 360/78.08, 78.09
   See application file for complete search history.

(56) References Cited

U.S. PATENT DOCUMENTS 5,654,840 A * 8/1997 Patton et al. ............ 360/75

(Continued)

FOREIGN PATENT DOCUMENTS

JP   3089709   7/2000
JP   2002-134807 A   5/2002

OTHER PUBLICATIONS

Hiroshi Toshiyoshi, et al., "A MEMS Piggyback Actuator for Hard-Disk Drives", Journal of Microelctromechanical Systems, vol. 11, No. 6, Dec. 2002, pp. 648-654.

(Continued)

*Primary Examiner*—K. Wong
(74) *Attorney, Agent, or Firm*—McDermott Will & Emery LLP

(57) ABSTRACT

A first estimator 13 estimates the position of a head based on a VCM driving signal $u_1$ and a voltage signal Va output from a VCM 6 to output a first head position estimation signal $x_{1est}$. The first estimator 13 estimates the disturbance acting on a head supporting mechanism 8 to output a disturbance estimation signal $\tau_{dest}$. A second estimator 15 estimates the displacement of the head based on a control signal $c_2$ for a fine adjustment actuator 7 to output a displacement estimation signal $x_{2est}$. The first head position estimation signal $x_{1est}$ and the displacement estimation signal $x_{2est}$ are added together to obtain a second head position estimation signal $x_{est}$. A position error signal e is generated using a head position signal x obtained by detecting the servo information and the second head position estimation signal $x_{est}$. A disturbance compensator 10 synthesizes a VCM control signal $c_1$ with the disturbance estimation signal $\tau_{dest}$ to generate the VCM driving signal $u_1$.

14 Claims, 9 Drawing Sheets

U.S. PATENT DOCUMENTS

| | | | |
|---|---|---|---|
| 5,978,752 A * | 11/1999 | Morris | 702/186 |
| 6,088,187 A * | 7/2000 | Takaishi | 360/78.05 |
| 6,483,659 B1 * | 11/2002 | Kobayashi et al. | 360/78.04 |
| 6,741,417 B1 * | 5/2004 | Hsin et al. | 360/78.05 |
| 6,747,836 B1 * | 6/2004 | Stevens et al. | 360/78.05 |
| 2001/0021086 A1 | 9/2001 | Kuwajima et al. | |
| 2002/0149869 A1 | 10/2002 | Inaji et al. | |

OTHER PUBLICATIONS

S. Nakamura et al., "An Electrostatic Micro Actuator for a Magnetic Head Tracking System of Hard Disk Drives", IEEE, TRANDUCERS '97, Jun. 16-19, 1997, pp. 1081-1084.

* cited by examiner

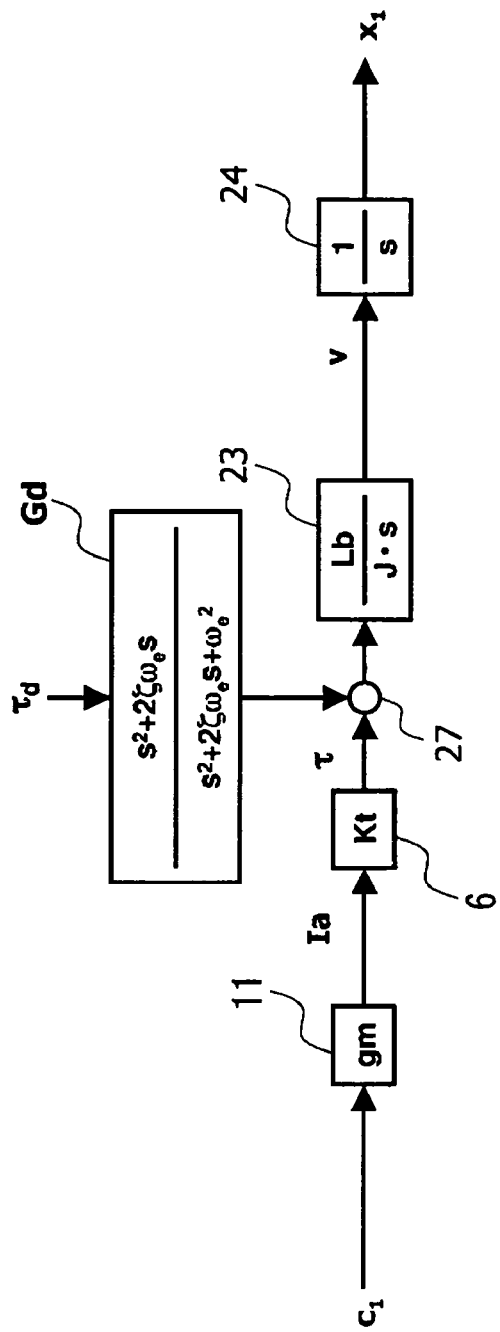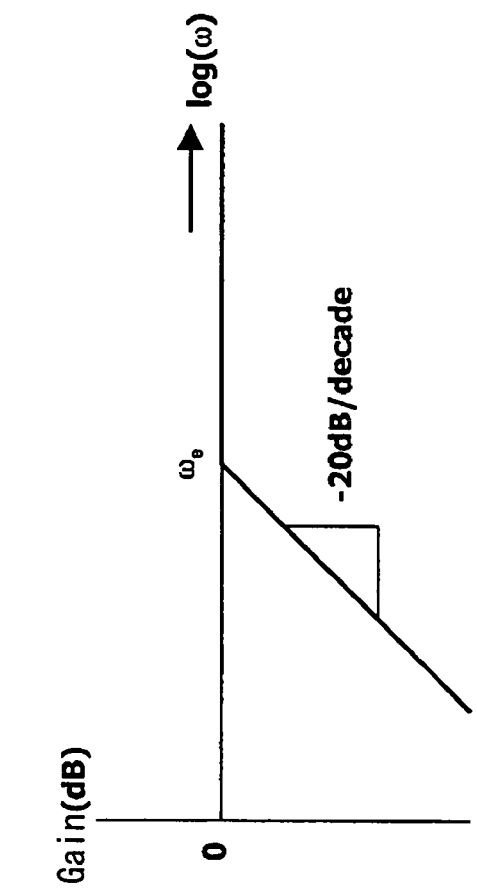
FIG. 3A
FIG. 3B

|  | 3.5-inch disk | 1.8-inch disk |
|---|---|---|
| Ri | 20 mm | 10 mm |
| Ro | 45 mm | 20 mm |
| Number of servo sectors | 200 | 200 |
| Ws | 50 μm | 50 μm |
| Wd | 578 μm | 264 μm |

HEAD POSITIONING METHOD, AND DISK APPARATUS USING THE SAME

BACKGROUND OF THE INVENTION

1. Field of the Invention

The present invention relates to a positioning method for positioning a head, such as a magnetic head, an optical pickup, or the like, on a desired position of a target track of a disk (recording medium) with high precision by using a general adjustment actuator and a fine adjustment actuator. The present invention further relates to a disk apparatus using such a control method.

2. Description of the Prior Art

In recent years, disk apparatuses, such as magnetic disk apparatuses, and the like, have been improved rapidly by decreasing the size and increasing the capacity thereof. For example, the capacity of a magnetic disk apparatus has been increased by increasing the track density of the magnetic disk, and the track pitch will be further reduced in the future. Therefore, in order to record/reproduce data to/from a magnetic disk, it is necessary to precisely position a magnetic head on concentrical tracks formed at a small pitch.

Generally, a magnetic head is supported by a head supporting mechanism provided in a magnetic disk apparatus. FIG. 9 is a plan view showing an exemplary structure of a conventional head supporting mechanism. A magnetic head 102 for recording/reproducing data to/from a spinning magnetic disk 101 is supported at an end of a suspension arm (also referred to as "supporting arm") 103. The other end of the suspension arm 103 is supported at an end of a carriage (also referred to as "base arm") 104. The carriage 104 is rotatably supported by a rotational bearing 105 which is fixed to a housing (not shown) of the magnetic disk apparatus.

A coil 106, which is a constituent of a voice coil motor (VCM), is fixed at the other end of the carriage 104. A magnetic circuit including a magnet 107 is fixed to the housing. The magnetic circuit controls a magnetizing current flowing through the coil 106 so that the carriage 104 pivots about the rotational bearing 105. With such a mechanism, the magnetic head 102, which is supported at the one end of the suspension arm 103, moves substantially in a radial direction of the magnetic disk 101.

The magnetic disk 101 contains servo information which are recorded in advance thereon at a predetermined angular interval. The magnetic head 102 is positioned based on the servo information. Specifically, in the positioning process of the magnetic head 102, the magnetic head 102 reads the servo information to detect track position information of the magnetic head 102. The magnetic head 102 generates a position error signal which indicates the position error of the magnetic head 102 with respect to a target track. The magnetic head 102 is positioned such that the position error signal is minimized. Such a positioning process is performed at every sampling cycle which is determined based on the rotation speed of the magnetic disk 101 and the number of pieces of servo information recorded in one track (the number of servo sectors in one track).

In order to precisely control the position of the magnetic head 102, it is necessary to shorten the sampling cycle to increase the control frequency of a magnetic head positioning system. However, the head supporting mechanism shown in FIG. 9 may have a natural vibration mode of higher-order. In such a case, if the control frequency is increased for the purpose of increasing the positioning precision, the positioning system may become unstable due to the natural vibration. In the conventional head supporting mechanism structure where the carriage 104 is rotated by the voice coil motor (VCM) 106 in order to position the magnetic head 102, it is difficult to achieve higher positioning precision.

As a countermeasure to such a problem, there have been proposed many implementations of a so-called "dual stage actuator" technique, wherein a fine adjustment actuator is further incorporated in the head supporting system, and the fine adjustment actuator is used in conjunction with the voice coil motor in order to precisely position a magnetic head. For example, in a proposed method, a thin film piezoelectric element which is capable of causing a tiny displacement and has a high natural resonance point is used as a fine adjustment actuator (see Japanese Unexamined Patent Publications Nos. 2001-216748 and 2002-134807 (corresponding to U.S. Patent Application Publication No. 2001/0021086 A1)). Another proposed method employs a servo technique in which a fine adjustment actuator is used in conjunction with a voice coil motor in order to position a magnetic head (see Japanese Patent No. 3089709).

On the other hand, as the size of magnetic disk apparatuses has been decreased in recent years, disturbance such as the friction force in a rotational bearing supporting a head supporting mechanism or the elastic force of the flexible print circuit that connects the actuator with a circuit substrate, presents a factor that further deteriorates the positioning precision for the magnetic head. In view of this, there has been proposed a positioning method for improving the positioning precision by compensating for such disturbance using disturbance estimation means. The disturbance estimation means operates based on a head position signal, which is extracted from servo information recorded on a magnetic disk, and a driving signal of the voice coil motor (see Japanese Unexamined Patent Publication No. 9-231701).

Increasing the control frequency of the magnetic head positioning system such that the maximum quick-response performance is gained in the fine adjustment actuator is a critical factor in the achievement of precise positioning of the magnetic head with the above-described dual stage actuator arrangement. However, in order to increase the control frequency, it is necessary to shorten the sampling cycle of sampling servo information. To this end, it is necessary to increase the number of servo sectors such that more servo information are recorded on a magnetic disk. However, as more servo information are recorded, the user data area is accordingly decreased, resulting in a decrease in the data format efficiency.

For example, as shown in FIG. 10, in a disk 101, servo areas 110 containing servo information and user data areas 111 are provided at a predetermined angular interval. For example, the length Ws of each servo area 110 and the length Wd of each user data area 111 for a 3.5-inch disk and a 1.8-inch disk are shown in the table of FIG. 11. As seen from FIG. 11, the length Wd of the user data area 111 decreases as the disk diameter decreases, but the length Ws of the servo area 110 does not decrease even if the disk diameter is decreased. This is because at least a certain amount of area is necessary for recording the servo information, and the length Ws of the servo area 110 cannot be decreased in proportion to the disk diameter.

The ratio of the servo areas 110 to the total area of the disk 101 is represented as Ws/(Wd+Ws). Thus, in the case of the 3.5-inch disk, the ratio is 50/(578+50)=8%. On the other hand, in the case of the 1.8-inch disk, the ratio is 50/(264+50)=16%. Thus, the ratio of the servo areas 110 to the total disk area increases as the disk size is decreased, resulting in a decrease in the data format efficiency.

In the above positioning method wherein disturbance is compensated for, the disturbance which acts on the head supporting mechanism is estimated based on the head position signal obtained from the servo information and the driving signal of the voice coil motor in order to compensate for external force. However, the servo information can be obtained only at every sampling cycle. Since this positioning method depends on the servo information, the band in which the disturbance can be estimated is limited by the sampling cycle of the servo information. As a result, the external force is not appropriately compensated for.

The present invention was conceived for the purpose of overcoming the above problems. An objective of the present invention is to provide a method for precisely positioning a head without increasing the number of servo sectors, i.e., without decreasing the data format efficiency. Another objective of the present invention is to provide a disk apparatus using such a positioning method.

SUMMARY OF THE INVENTION

A head positioning method of the present invention is a method for positioning a head with respect to a rotating disk by using an actuator, the actuator including a general adjustment actuator which has a voice coil motor and has a stroke covering the entire disk and a fine adjustment actuator which is interposed between the general adjustment actuator and the head and has a stroke smaller that that of the general adjustment actuator, the method comprising the steps of: generating a first driving signal for driving the general adjustment actuator and a second driving signal for driving the fine adjustment actuator; detecting a voltage generated in the voice coil motor due to the driving of the general adjustment actuator to generate a voltage signal which indicates the detected voltage value; estimating the position of the head displaced due to the driving of the general adjustment actuator based on the first driving signal and the voltage signal to generate a first head position estimation signal; estimating a displacement of the fine adjustment actuator based on the second driving signal to generate a displacement estimation signal; adding together the first head position estimation signal and the displacement estimation signal to generate a second head position estimation signal; generating from a target position signal which indicates a target position of the head and the second head position estimation signal, a position error estimation signal which indicates an error of the head with respect to the target position; and correcting the first driving signal and the second driving signal based on the position error estimation signal.

The position error estimation signal is generated independently of the sampling cycle of the servo information. Thus, according to the above method, even at the time when the servo information cannot be sampled, it is possible to estimate the position error, and it is possible to appropriately position the head.

Preferably, the positioning method further comprises the steps of: detecting the position of the head by reproducing, with the head, servo information recorded in advance on the disk; and generating a position error signal which indicates an error of the head with respect to the target position based on the detected head position and the target position; wherein the method includes, in place of the driving signal correction step, a correction step of correcting the first driving signal and the second driving signal selectively using one of the position error signal and the position error estimation signal.

Preferably, the correction step is performed at a predetermined cycle that is shorter than a sampling cycle of the servo information; in a period during which the servo information is reproduced with the head, the position error signal is used; and in a period during which the servo information is not reproduced with the head, the position error estimation signal is used.

With such features, the position error signal can be generated independently of the sampling cycle of the servo information, although the position error signal is generated at the sampling cycle of the servo information. Thus, at the time when the servo information can be sampled, the positioning of the head is performed based on the position error signal. On the other hand, at the time when the servo information cannot be sampled, the positioning of the head is performed based on the position error estimation signal. Accordingly, the sampling cycle is shortened without substantially increasing the number of servo sectors, and the control frequency of the head positioning system is increased. As a result, precise head positioning is achieved without decreasing the data format efficiency.

Preferably, the positioning method further comprises the steps of: estimating the magnitude of disturbance acting on the general adjustment actuator based on the first driving signal and the voltage signal to generate a disturbance estimation signal; and generating from the disturbance estimation signal a disturbance compensation signal which compensates for disturbance and synthesizing the first driving signal and the disturbance compensation signal to correct the first driving signal.

With such features, disturbance such as bearing friction, inertial force, etc., is compensated for, and the head positioning precision is improved.

Preferably, the head positioning method further comprises the steps of: sequentially detecting the position of the head by reproducing, with the head, servo information recorded in advance on the disk; and after detecting the position of the head, sequentially correcting the first head position estimation signal based on the detected head position.

With such features, estimation of the head position shifted due to the driving of the general adjustment actuator is carried out with more precision.

Preferably, the fine adjustment actuator is formed by a piezoelectric element. Preferably, the piezoelectric element has a characteristic that causes a displacement generally proportional to the second driving signal.

Since the displacement of the fine adjustment actuator is generally proportional to the driving signal, the displacement estimation signal, which is an estimation result for the displacement of the fine adjustment actuator, is readily and correctly generated.

A disk apparatus of the present invention comprises: a disk on which information is recorded; a motor for rotating the disk; a head for at least reproducing the information on the disk; a head supporting mechanism including a general adjustment actuator which has a voice coil motor and has a stroke covering the entire disk and a fine adjustment actuator which is interposed between the general adjustment actuator and the head and has a stroke smaller that that of the general adjustment actuator; a controller for generating a first driving signal and a second driving signal; a first driver for driving the general adjustment actuator according to the first driving signal; a second driver for driving the fine adjustment actuator according to the second driving signal; a voltage detector for detecting a voltage generated in the voice coil motor due to the driving of the general adjustment actuator to output a voltage signal which indicates the detected voltage value; a first estimator for estimating the position of the head displaced due to the driving of the general adjustment actuator based on the first driving signal and the voltage signal to output a first head position estimation signal; a second estimator for estimating a displacement of the fine adjustment actuator based on the second driving signal to output a displacement estimation signal; an adder for adding together the first head position estimation signal and the displacement estimation signal to output a second head position estimation signal; and a position error generator for generating from a target position signal which indicates a target position of the head and the second head position estimation signal, a position error estimation signal which indicates an error of the head with respect to the target position, wherein the controller corrects the first driving signal and the second driving signal based on the position error estimation signal.

Preferably, the position error generator generates a position error signal which indicates an error of the head with respect to the target position by reproducing, with the head, servo information recorded in advance on the disk; and the controller corrects the first driving signal and the second driving signal selectively using one of the position error estimation signal and the position error signal.

Preferably, the controller corrects the first driving signal and the second driving signal at a predetermined cycle that is shorter than a sampling cycle of the servo information; in a period during which the servo information is reproduced with the head, the position error signal is used; and in a period during which the servo information is not reproduced with the head, the position error estimation signal is used.

Preferably, the disk apparatus further comprises a disturbance compensator for synthesizing a disturbance compensation signal which indicates an estimated magnitude of disturbance acting on the general adjustment actuator with the first driving signal to generate a disturbance-compensated first driving signal, wherein the first estimator estimates the magnitude of the disturbance acting on the general adjustment actuator based on the disturbance-compensated first driving signal and the voltage signal to generate the disturbance compensation signal.

Preferably, the first estimator sequentially corrects the first head position estimation signal based on the detected head position that is obtained by reproducing the servo information with the head.

Preferably, the fine adjustment actuator is formed by a piezoelectric element. Preferably, the piezoelectric element has a characteristic that causes a displacement generally proportional to the second driving signal.

As described above, according to the present invention, the positioning of the head can be carried out using the general adjustment actuator and the fine adjustment actuator even at the time when the servo information is not sampled. By employing the method or structure of the present invention, it is possible to generate the position error signal independently of the sampling cycle of the servo information. Thus, it is possible to increase the control frequency of the head positioning system without increasing the number of servo sectors, i.e., without decreasing the data format efficiency.

At the same time when the head position estimation signal is generated, disturbance (such as the friction in the rotational bearing, the elastic force of the flexible print circuit, the impact or vibration on the disk apparatus, etc.) is estimated to compensate for the disturbance, whereby off-track due to disturbance is suppressed. As a result, the positioning of the head is stably and precisely carried out, and a highly reliable disk apparatus is provided.

BRIEF DESCRIPTION OF THE DRAWINGS

FIG. 3A is a block diagram illustrating a disturbance suppressing operation according to an embodiment of the present invention. FIG. 3B shows a cutoff frequency characteristic against disturbance according to an embodiment of the present invention.

FIG. 5A is a timing chart which illustrates the sampling times of servo information. FIG. 5B is a timing chart which illustrates the operation of a switch provided in the position error detector. FIG. 5C is a timing chart which illustrates the times of generation of a control signal.

DESCRIPTION OF THE PREFERRED EMBODIMENTS

Hereinafter, an embodiment of the present invention is described in detail with reference to the drawings.

Figure 1:
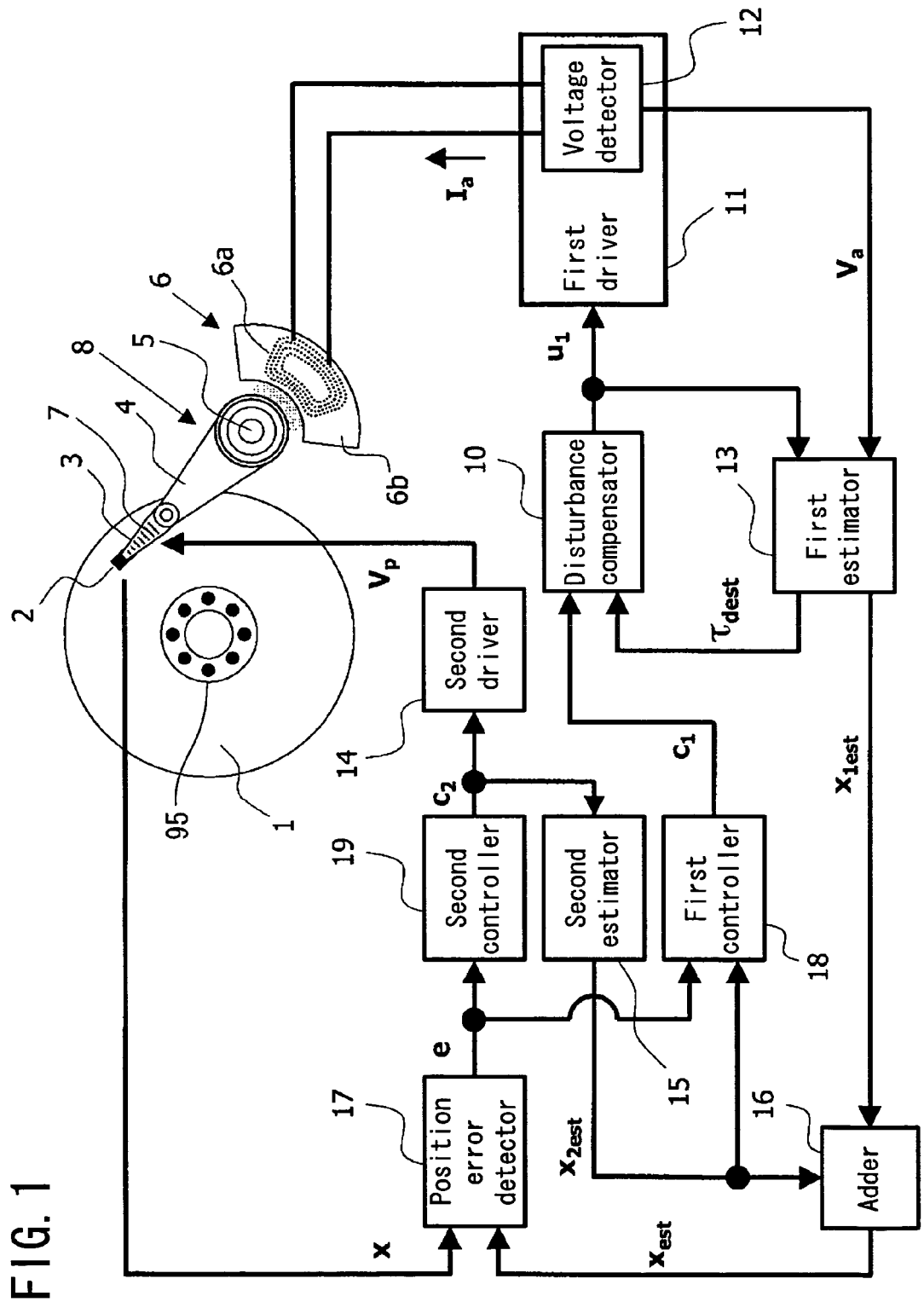
FIG. 1 is a block diagram showing the structure of a principal part of a magnetic disk apparatus according to an embodiment of the present invention.

FIG. 1 is a block diagram showing the structure of a principal part of a magnetic disk apparatus according to an embodiment of the present invention. Referring to FIG. 1, a magnetic disk 1 is spun by a spindle motor 95. A slider 2 has a magnetic head 2a (see FIG. 6) mounted thereon, which records/reproduces data to/from the magnetic disk 1. The slider 2 is supported at an end of a suspension arm 3. The other end of the suspension arm 3 is supported at an end of a carriage 4. The carriage 4 is rotatably supported by a rotational bearing 5 which is fixed to a housing (not shown) of the magnetic disk apparatus.

Figure 6:
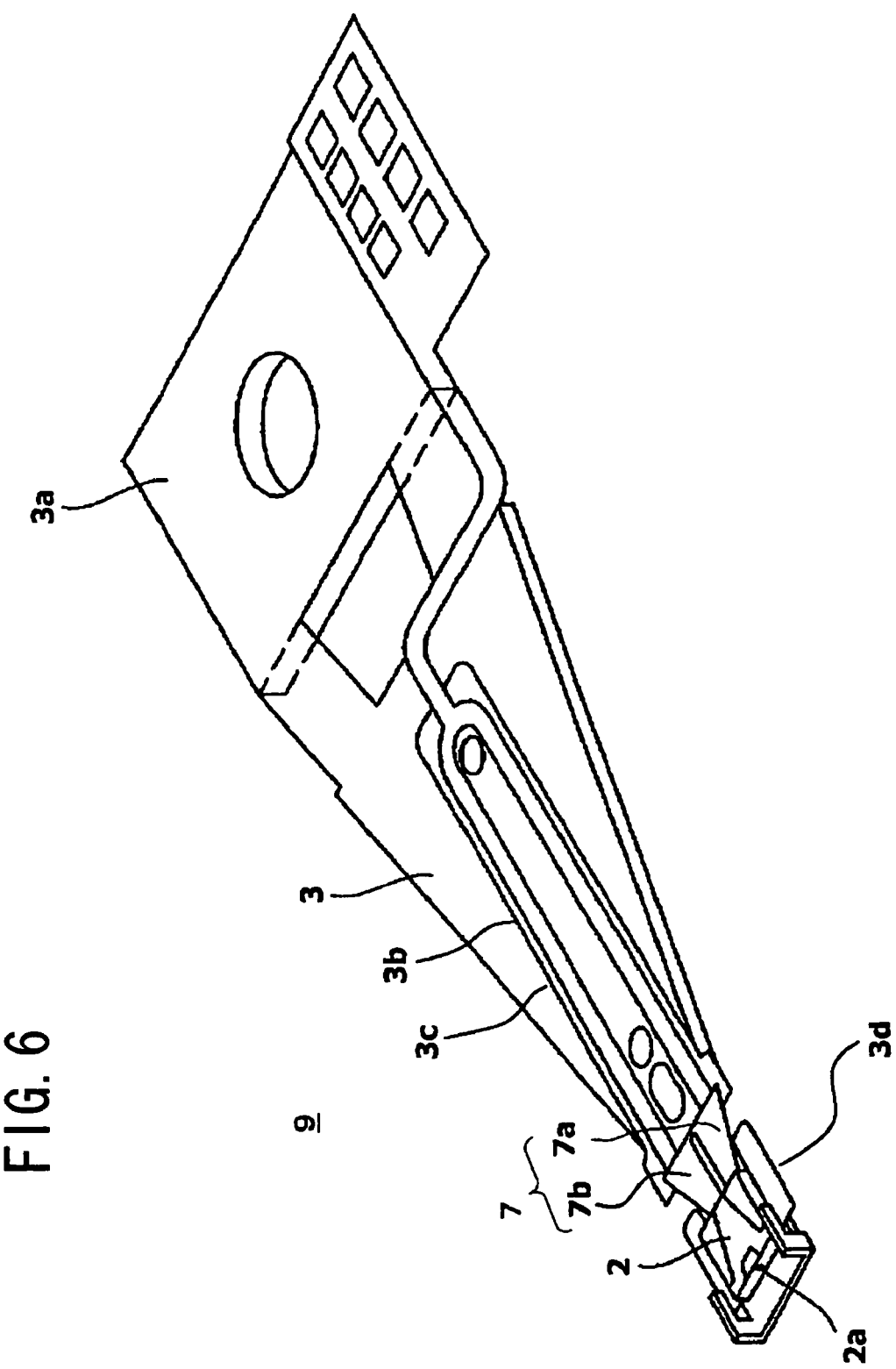
FIG. 6 is a perspective view showing the structure of a suspension section including a fine adjustment actuator according to an embodiment of the present invention.

Referring to FIG. 6, a fine adjustment actuator 7 which is formed by two thin film piezoelectric elements 7a and 7b is mounted on the suspension arm 3. The suspension arm 3 is structured such that the voltages applied to the thin film piezoelectric elements 7a and 7b are controlled to cause a tiny displacement in the slider 2. FIG. 6 is a perspective view showing a side of a suspension 9 which faces the magnetic disk 1. On this side of the suspension 9, the slider 2, the suspension arm 3, the fine adjustment actuator 7 etc., are provided. The suspension arm 3 is fixed to the carriage 4 at an end base portion 3a by, for example, welding, or the like. The suspension arm 3 includes a flexure element 3c which has a magnetic head wiring pattern and a wiring pattern for a thin film piezoelectric element. The flexure element 3c is patterned on a flexure substrate 3b.

Figure 7:
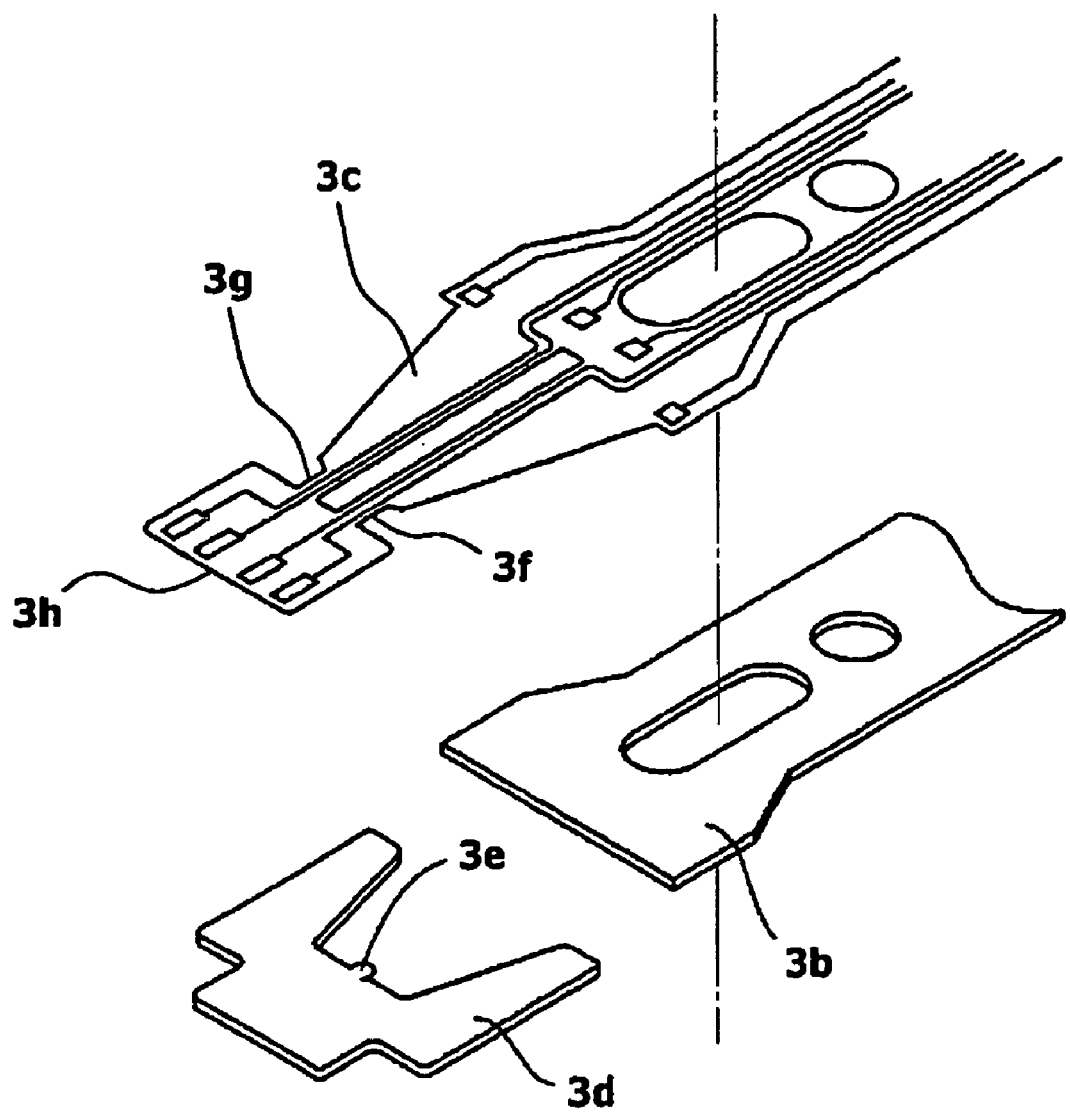
FIG. 7 is an exploded, enlarged perspective view which shows a slider attachment section of the suspension section according to an embodiment of the present invention.

FIG. 7 is an exploded, enlarged perspective view showing a slider attachment section which includes the flexure element 3c, the flexure substrate 3b, and a slider retaining plate 3d. The other side of a slider attaching section 3h of the flexure element 3c on which the slider 2 is not attached has the slider retaining plate 3d placed thereon. The slider retaining plate 3d has a protrusion 3e. The protrusion 3e abuts on a dimple (not shown) formed at a tip of the suspension arm 3. Furthermore, the thin film piezoelectric elements 7a and 7b are adhered to the flexure element 3c as shown in FIG. 6.

Figure 8:
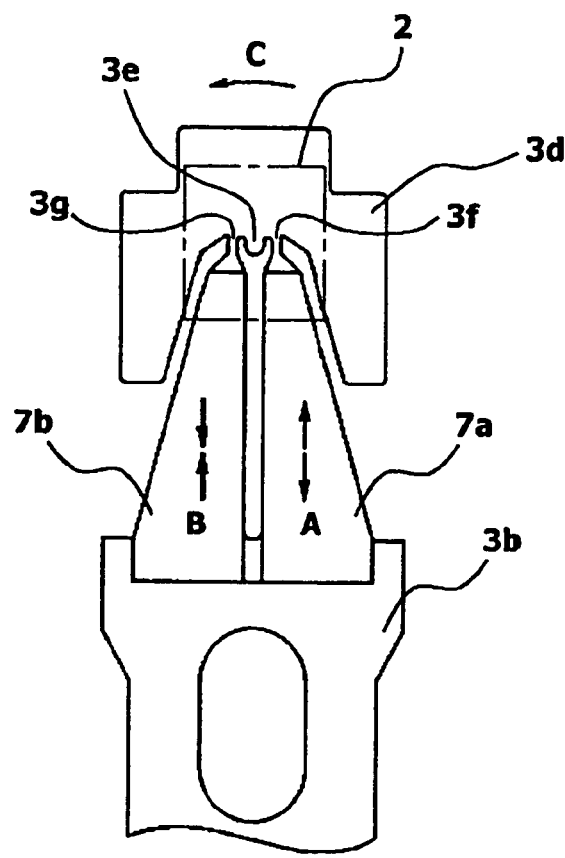
FIG. 8 illustrates an operation of a fine adjustment actuator formed by a thin film piezoelectric element according to an embodiment of the present invention.
Figure 9:
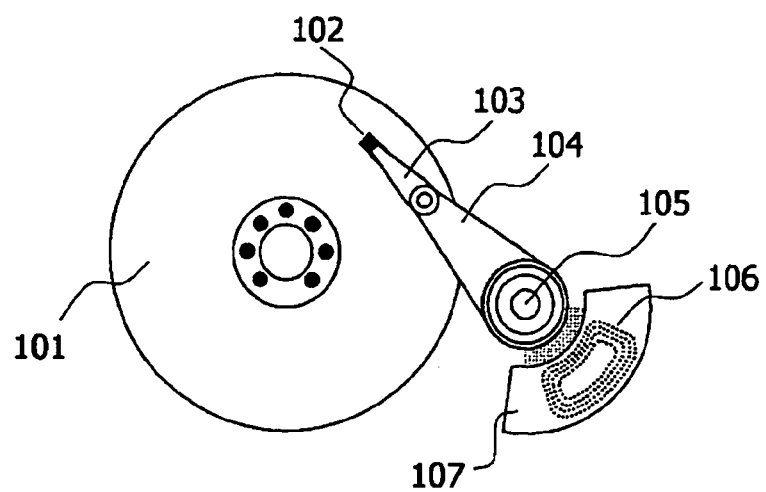
FIG. 9 is a plan view showing an exemplary structure of a conventional head supporting mechanism.
Figures 10, 11:
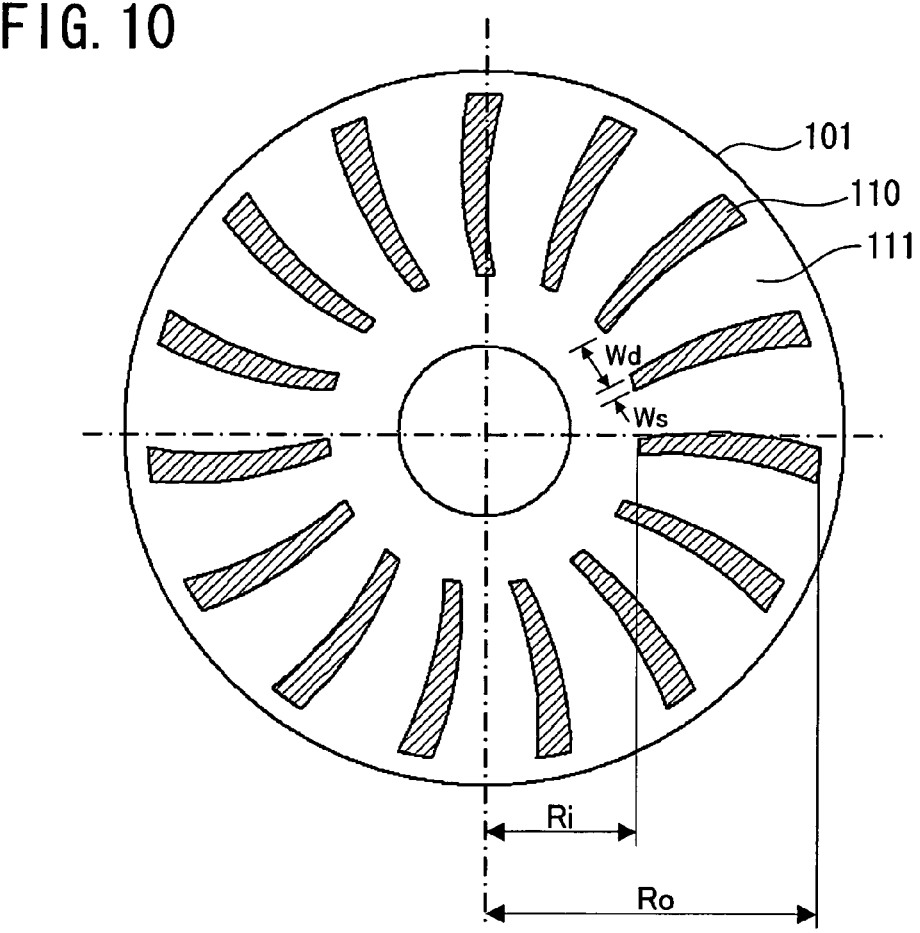
FIG. 10 is a conceptual diagram illustrating areas on a magnetic disk.
FIG. 11 shows the specifications of a 3.5"-disk and a 1.8"-disk.

FIG. 8 illustrates a rotational operation of the slider 2 which is performed when the thin film piezoelectric elements 7a and 7b are activated. When the thin film piezoelectric element 7a extends along direction A and the thin film piezoelectric element 7b contracts along direction B, the slider 2 and the slider retaining plate 3d rotates in direction C around the dimple abutting the protrusion 3e formed in the slider retaining plate 3d. Accordingly, the magnetic head 2a provided on the slider 2 moves in a radial direction of the magnetic disk 1. The widths of elastic hinge sections 3f and 3g have sufficient sizes for forming a magnetic head wiring pattern, but are formed in a size as small as possible such that a load on the rotating slider 2 is decreased. Thus, the slider 2 surely rotates by extension/contraction of the thin film piezoelectric elements 7a and 7b.

The fine adjustment actuator 7 may be fabricated by a fabrication method disclosed in U.S. Patent Application Publication No. 2001/0021086 A1, which is incorporated herein by reference.

The voice coil motor (VCM) 6 is formed by a coil 6a and a magnet 6b which are constituents of a magnetic circuit. The coil 6a is fixed to the other end of the carriage 4. The magnet 6b is fixed to the housing. When an electric current flows through the coil 6a, rotational force is exerted on the carriage 4 due to an interaction between a magnetic flux generated by the electric current and a magnetic flux generated by the magnetic circuit. Thus, by controlling the electric current supplied to the coil 6a, the slider 2 including the magnetic head 2a is allowed to move substantially in a radial direction of the magnetic disk 1.

The suspension arm 3, the carriage 4, the rotational bearing 5 and the voice coil motor 6 constitute the general adjustment actuator. A head supporting mechanism 8 is formed by the slider 2, the suspension arm 3, the carriage 4, the rotational bearing 5, the voice coil motor 6 and the fine adjustment actuator 7.

Next, the entire structure of a control system for positioning the magnetic head 2a mounted on the slider 2 to a target position on the magnetic disk 1 using the head supporting mechanism 8 is described.

Referring to FIG. 1, a first driver 11 allows a driving current Ia corresponding to a voice coil motor driving signal $u_1$ to be passed through the coil 6a to drive the voice coil motor 6. A voltage detector 12 included in the first driver 11 detects the voltage which is generated between the both ends of the coil 6a due to the driving of the voice coil motor 6 to output a voltage signal Va. A first estimator 13 estimates a disturbance torque which acts on the head supporting mechanism 8 based on the voltage signal Va output from the voltage detector 12 and the voice coil motor driving signal $u_1$ which is also input to the first driver 11, so as to output a disturbance estimation signal $\tau_{dest}$. The first estimator 13 estimates the position of the magnetic head 2a which has been displaced due to the driving of the voice coil motor 6, so as to output a first head position estimation signal $x_{1est}$.

A second driver 14 applies a driving voltage Vp corresponding to a fine adjustment actuator control signal $c_2$ to the fine adjustment actuator 7. A second estimator 15 estimates the displacement of the magnetic head 2a which has been caused due to the driving of the fine adjustment actuator 7 according to the fine adjustment actuator control signal $c_2$, so as to output a displacement estimation signal $x_{2est}$. An adder 16 adds together the first head position estimation signal $x_{1est}$ output from the first estimator 13 and the displacement estimation signal $x_{2est}$ output from the second estimator 15, so as to output a second head position estimation signal $x_{est}$.

In the magnetic disk 1, track position signals are recorded as servo information in respective tracks at a predetermined angular interval. The position signals are read by the magnetic head 2a at a predetermined sampling cycle. Receiving a head position signal x read by the magnetic head 2a and the second head position estimation signal $x_{est}$, a position error detector 17 generates a position error signal e which indicates a difference between the current position of the magnetic head 2a and a target position r of a target track.

Receiving the position error signal e generated by the position error detector 17 and the displacement estimation signal $x_{2est}$ output from the second estimator 15, a first controller 18 generates a voice coil motor control signal $c_1$. The voice coil motor control signal $c_1$ is input to a disturbance compensator 10 and synthesized with the disturbance estimation signal $\tau_{dest}$ generated by the first estimator 13. The disturbance compensator 10 generates the voice coil motor driving signal $u_1$ from the voice coil motor control signal $c_1$ and the disturbance estimation signal $\tau_{dest}$. Receiving the position error signal e generated by the position error detector 17, a second controller 19 generates the fine adjustment actuator control signal $c_2$.

Next, an operation of a positioning system of a magnetic disk apparatus according to an embodiment of the present invention is described with reference to FIG. 2 through FIG. 5. Note that in FIG. 2 and FIG. 3, "s" represents a Laplace operator. Moreover, in FIG. 2, FIG. 3 and FIG. 4, the hold element occurring while sampling the servo information is omitted for the sake of simplicity.

Figure 2:
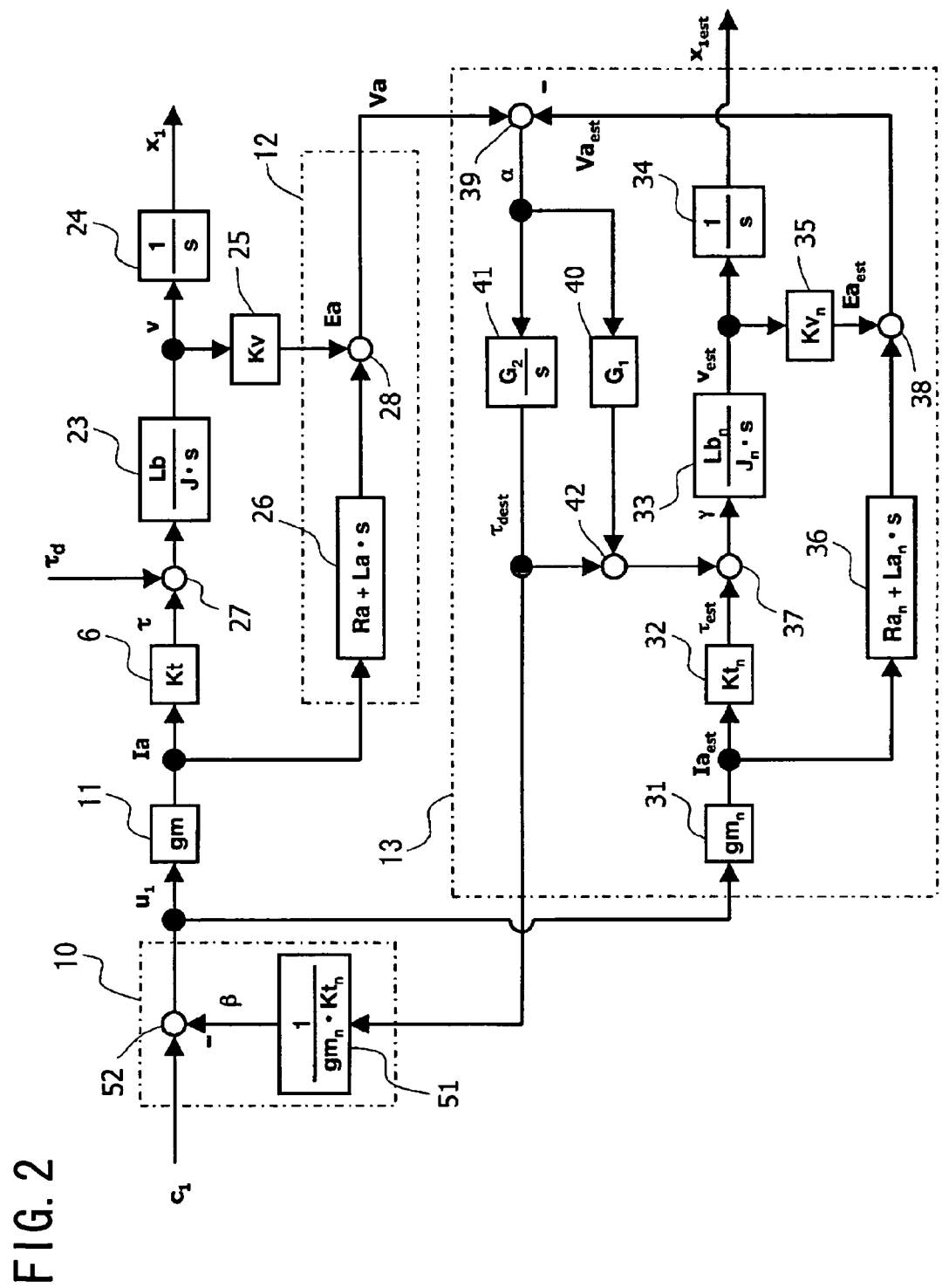
FIG. 2 is a block diagram showing a part of the structure of a positioning system according to an embodiment of the present invention.

FIG. 2 is a block diagram which illustrates the cooperation of the first driver 11, the voltage detector 12, the first estimator 13 and the disturbance compensator 10, which are components of the positioning system of the magnetic disk apparatus according to the present embodiment. In FIG. 2, the blocks corresponding to the elements of FIG. 1 are denoted by the same reference numerals used in FIG. 1.

The voice coil motor control signal $c_1$ output from the first controller 18 is converted to the voice coil motor driving signal $u_1$ through the disturbance compensator 10. The operation of the disturbance compensator 10 will be described later. In the first driver 11 which is represented by the block of transfer function "gm", the voice coil motor driving signal $u_1$ is converted from a voltage signal into a current signal that is gm times the voltage signal. The resultant current signal is output as the driving current Ia. When the driving current Ia is passed through the coil 6a, a magnetic field is generated. By the interaction between the generated magnetic flux and a magnetic flux generated by the magnet 6b, a driving torque τ is generated in the voice coil motor 6. That is, the driving current Ia is converted by the voice coil motor 6 with a transfer function Kt into the driving torque τ. Herein, the transfer function Kt represents the torque constant of the voice coil motor 6. The transfer function (Lb/J·s) of a block 23 represents the transfer characteristic from the driving torque τ generated by the voice coil motor 6 to the traveling velocity v of the magnetic head 2a. Herein, J denotes the moment of inertia of the head supporting mechanism 8, and Lb denotes the distance from the rotation center of the rotational bearing 5 to the magnetic head 2a. A block 24 is an integrator, and the transfer function thereof is represented as 1/s. The integrator 24 converts the traveling velocity v of the magnetic head 2a into the position $x_1$ of the magnetic head 2a which has been shifted due to the driving of the voice coil motor 6.

The disturbance $\tau_d$ acting upon the head supporting mechanism 8 (such as the bearing friction in the rotational bearing 5, the elastic force of the flexible print circuit that connects the head supporting mechanism 8 with an electronic circuit substrate, or the inertial force acting upon the head supporting mechanism 8 from the external impact or vibration on the magnetic disk apparatus) is expressed in a form that is suitable as an input to an adder 27 preceding the block 23.

As the voice coil motor 6 drives, an induced voltage Ea proportional to the pivoting speed of the head supporting mechanism 8 occurs between the opposite ends of the coil 6a. The induced voltage Ea is expressed by Expression (1) where Kv represents a factor of proportionality.

$$Ea = \frac{Lb \cdot Kv}{J \cdot s}(\tau + \tau_d) \quad (1)$$

A one-dot-chain-line block including a block 26 and an adder 28 corresponds to the voltage detector 12 of FIG. 1. The voltage detector 12 outputs the voltage signal Va, which is produced at the adder 28 by adding together the induced voltage Ea output from a block 25 and a voltage drop (Ra+La·s)·Ia that occurs as the driving current Ia is passed through the coil 6a. The voltage signal Va is expressed by Expression (2).

$$Va = Ea + (Ra + La \cdot s) \cdot Ia \quad (2)$$

In this expression, Ra denotes the coil resistance of the coil 6a, and La denotes the inductance of the coil 6a. Based on Expression (1) and Expression (2), the voltage signal Va is expressed as Expression (3).

$$Va = \frac{Lb \cdot Kv}{J \cdot s}(\tau + \tau_d) + (Ra + La \cdot s) \cdot Ia \quad (3)$$

A one-dot-chain-line block on the lower right in FIG. 2 corresponds to the first estimator 13 of FIG. 1. The block 13 includes transfer functions represented by blocks 31, 32, 33, 34, 35 and 36. The blocks 31–36 correspond to the blocks 21–26 and have substantially the same transfer functions as those of the blocks 21–26, respectively. In the disturbance estimator block 13, the suffix "n" to a constant indicates that it is a nominal value, and a variable with the "est" is an estimated value.

The voice coil motor driving signal $u_1$, which is input to the first driver 11, is also input to the first estimator 13. The voice coil motor driving signal $u_1$ is multiplied by $(gm_n \cdot Kt_n)$ through the block 31 and the block 32 to obtain a driving torque estimation signal $\tau_{est}$, which is an estimated value of the driving torque τ generated by the voice coil motor 6.

A velocity estimation signal $v_{est}$ is output from the block 33. The block 34 is an integrator, which has a transfer function of 1/s. The integrator 34 converts the velocity estimation signal $v_{est}$ to the first head position estimation signal $x_{1est}$ which represents an estimated position of the magnetic head 2a shifted due to the driving of the voice coil motor 6.

In the block 35, the velocity estimation signal $v_{est}$ is multiplied by $Kv_n$ to produce an induced voltage estimation signal $Ea_{est}$. The induced voltage estimation signal $Ea_{est}$ and the voltage drop $(Ra_n + La_n \cdot s) \cdot Ia_{est}$, which occurs as a driving current estimation signal $Ia_{est}$ is passed through the coil 6a, are added together by an adder 38, which outputs a voltage estimation signal $Va_{est}$. The voltage estimation signal $Va_{est}$ is input to a subtractor 39, where it is compared with the voltage signal Va actually detected by the voltage detector 12 to yield an error signal α ($=Va-Va_{est}$). The error signal α is input to a multiplier represented by a block 40 and to an integrator represented by a block 41. The integrator of the block 41 integrates the error signal α to output the disturbance estimation signal $\tau_{dest}$ indicating the estimated value of disturbance. The multiplier of the block 40 multiplies the error signal α by $G_1$ and the multiplied signal is input to an adder 42. The adder 42 adds together the disturbance estimation signal $\tau_{dest}$ and the signal obtained by multiplying the error signal α by $G_1$ and inputs a resultant signal to an adder 37. The adder 37 adds together the driving torque estimation signal $\tau_{est}$ output from the block 32 and the output signal from the adder 42. A result γ of the addition is output to the block 33.

Note that the coefficient $G_1$ of the block 40 and the coefficient $G_2$ of the block 41 are constants for stabilizing the operation of the first estimator 13, and will later be described in detail.

Another one-dot-chain-line block on the upper left in FIG. 12 corresponds to the disturbance compensator 10 of FIG. 1. A block 51 included in the disturbance compensator 10 multiplies the disturbance estimation signal $\tau_{dest}$ by $1/(gm_n \cdot Kt_n)$ to produce the disturbance compensation signal β that is required for causing the voice coil motor 6 to generate a driving force having a magnitude corresponding to the disturbance estimation signal $\tau_{dest}$. A subtractor 52 subtracts the disturbance compensation signal β from the voice coil motor control signal $c_1$ to generate the voice coil motor driving signal $u_1$.

Next, the operation of the first estimator 13 will be described. The disturbance estimation signal $\tau_{dest}$ output from the block 41 is expressed by Expression (4).

$$\tau_{dest} = \frac{G_2}{s} \cdot (Va - Va_{est}) \quad (4)$$

Moreover, the output γ from the subtractor 37 is expressed by Expression (5).

$$\gamma = \tau_{est} + \left(G_1 + \frac{G_2}{s}\right) \cdot (Va - Va_{est}) \quad (5)$$

The voltage estimation signal $Va_{est}$ is expressed by Expression (6).

$$Va_{est} = Ea_{est} + (Ra_n + La_n \cdot s) \cdot Ia_{est} \qquad (6)$$

The induced voltage estimation signal $Ea_{est}$ is expressed by Expression (7).

$$Ea_{est} = \frac{Lb_n \cdot Kv_n}{J_n \cdot s} \cdot \gamma \qquad (7)$$

Expression (6) can be transformed into Expression (8) based on Expression (5) and Expression (7).

$$Va_{est} = \qquad (8)$$
$$\frac{Lb_n \cdot Kv_n}{J_n \cdot s}\left[\tau_{est} + \left(G_1 + \frac{G_2}{s}\right) \cdot (Va - Va_{est})\right] + (Ra_n + La_n \cdot s) \cdot Ia_{est}$$

For the sake of simplicity of illustration, it is assumed that the value of the transfer function gm of the first driver 11 is equal to that of the transfer function $gm_n$ of the block 31. Thus, the driving current Ia is equal to the driving current estimation signal $Ia_{est}$. Furthermore, assuming that Ra and La of the block 26 are equal to $Ra_n$ and $La_n$ of the block 36, respectively, the voltage drop $(Ra+La \cdot s) \cdot Ia$ that occurs as the driving current Ia is passed through the driving coil 6a is equal to the voltage drop $(Ra_n+La_n \cdot s) \cdot Ia_{est}$ that occurs as the driving current estimation signal $Ia_{est}$ is passed therethrough. Thus, Expression (9) holds.

$$(Ra + La \cdot s) \cdot Ia = (Ra_n + La_n \cdot s) \cdot Ia_{est} \qquad (9)$$

Moreover, assuming Expression (10) holds, $$\frac{Lb \cdot Kv}{J} = \frac{Lb_n \cdot Kv_n}{J_n} \qquad (10)$$

subtracting the left and right sides of Expression (8) from the left and right sides of Expression (3), respectively, while using Expressions (9) and (10), yields Expression (11).

$$Va - Va_{est} = \frac{Lb_n \cdot Kv_n}{J_n \cdot s}\left[\tau + \tau_d - \tau_{est} - \left(G_1 + \frac{G_2}{s}\right) \cdot (Va - Va_{est})\right] \qquad (11)$$

The driving torque estimation signal $\tau_{est}$ represents an estimated value of the driving torque $\tau$ of the voice coil motor 6. Assuming that $\tau_{est}$ is equal to $\tau$, Expression (11) can be rewritten as Expression (12).

$$Va - Va_{est} = \frac{Lb_n \cdot Kv_n}{J_n \cdot s}\left[\tau_d - \left(G_1 + \frac{G_2}{s}\right) \cdot (Va - Va_{est})\right] \qquad (12)$$

By transforming Expression (12) using Expression (4), one can derive the relationship between the disturbance $\tau_d$ acting upon the head supporting mechanism 8 and the disturbance estimation signal $\tau_{dest}$, obtaining Expression (13).

$$\tau_{dest} = \frac{\dfrac{Lb_n \cdot Kv_n}{J_n}G_2}{s^2 + \dfrac{Lb_n \cdot Kv_n}{J_n}G_1 \cdot s + \dfrac{Lb_n \cdot Kv_n}{J_n}G_2} \cdot \tau_d \qquad (13)$$

It can be seen from Expression (13) that the first estimator 13 is capable of estimating the actual disturbance $\tau_d$ with a secondary delay system from the voice coil motor driving signal $u_1$ and the voltage signal Va through the loop in the one-dot-chain-line block of FIG. 2.

Where the natural angular frequency (estimated angular frequency) of the secondary delay system is denoted by $\omega_e$ and the damping factor is denoted by $\zeta$, the constants $G_1$ and $G_2$ for stabilizing the operation of the first estimator 13 can be expressed as Expression (14) and Expression (15), respectively. Then, Expression (13) can be expressed as Expression (16).

$$G_1 = 2\zeta\omega_e \cdot \frac{J_n}{Lb_n \cdot Kv_n} \qquad (14)$$

$$G_2 = \omega_e^2 \cdot \frac{J_n}{Lb_n \cdot Kv_n} \qquad (15)$$

$$\tau_{dest} = \frac{\omega_e^2}{s^2 + 2\zeta\omega_e \cdot s + \omega_e^2} \cdot \tau_d \qquad (16)$$

As described above, in FIG. 2, the block 51 of the disturbance compensator 10 outputs to the subtractor 52 the disturbance compensation signal $\beta$ generated by multiplying the disturbance estimation signal $\tau_{dest}$ by $1/(gm_n \cdot Kt_n)$. The subtractor 52 subtracts the disturbance compensation signal $\beta$ from the voice coil motor control signal $c_1$ to generate the voice coil motor driving signal $u_1$. The disturbance compensation signal $\beta$ is a correction signal required for causing the voice coil motor 6 to generate a driving force having a magnitude corresponding to the disturbance estimation signal $\tau_{dest}$. The disturbance compensation signal $\beta$ is multiplied by $(gm \cdot Kt)$ through the first driver 11 and the voice coil motor 6. Thus, in the block 51, the disturbance estimation signal $\tau_{dest}$ is multiplied by $1/(gm_n \cdot Kt_n)$ in advance such that the disturbance compensation signal $\beta$ multiplied by $(gm \cdot Kt)$ is equal to the disturbance estimation signal $\tau_{dest}$.

The voice coil motor driving signal $u_1$ is expressed by Expression (17).

$$u_1 = c_1 - \frac{1}{gm_n \cdot Kt_n} \cdot \tau_{dest} \qquad (17)$$

The output of the adder 27 is expressed by Expression (18).

$$gm \cdot Kt \cdot u_1 + \tau_d \qquad (18)$$

Assuming that gm is equal to $gm_n$ and Kt is equal to $Kt_n$, Expression (18) can be rewritten as Expression (19) using Expressions (16) and (17).

$$gm \cdot Kt \cdot c_1 + \frac{s^2 + 2\zeta\omega_e \cdot s}{s^2 + 2\zeta\omega_e \cdot s + \omega_e^2} \cdot \tau_d \qquad (19)$$

Based on Expression (19), the block diagram of FIG. 2 can be illustrated in a simplified form using the transfer function Gd as shown in FIG. 3A.

Herein, it is assumed that the transfer function Gd is expressed as Expression (20).

$$Gd(s) = \frac{s^2 + 2\zeta\omega_e \cdot s}{s^2 + 2\zeta\omega_e \cdot s + \omega_e^2} \quad (20)$$

FIG. 3B approximately represents the frequency characteristic of the transfer function Gd (s) by a thick line. If the angular frequency is lower than $\omega_e$, the gain is smaller than 0 dB. In this frequency band, the gain is attenuated by an attenuation ratio of −20 dB/dec (decade) as the angular frequency $\omega$ decreases. (Herein, "dec" means "tenfold".) That is, the transfer function Gd (s) has a low cutoff filter characteristic which suppresses an angular frequency lower than the angular frequency $\omega_e$.

As described above, in the magnetic disk apparatus according to the present embodiment of the present invention, the disturbance $\tau_d$ which acts on the head supporting mechanism 8 is estimated by the first estimator 13 and is cancelled using the disturbance estimation signal $\tau_{dest}$. Specifically, before the disturbance $\tau_d$ affects the positioning system, the disturbance $\tau_d$ is passed through the transfer function Gd (s) which functions as if it is a low cutoff filter. Thus, the disturbance which acts on the head supporting mechanism 8 is suppressed, and the reliable head positioning is achieved.

Figure 4:
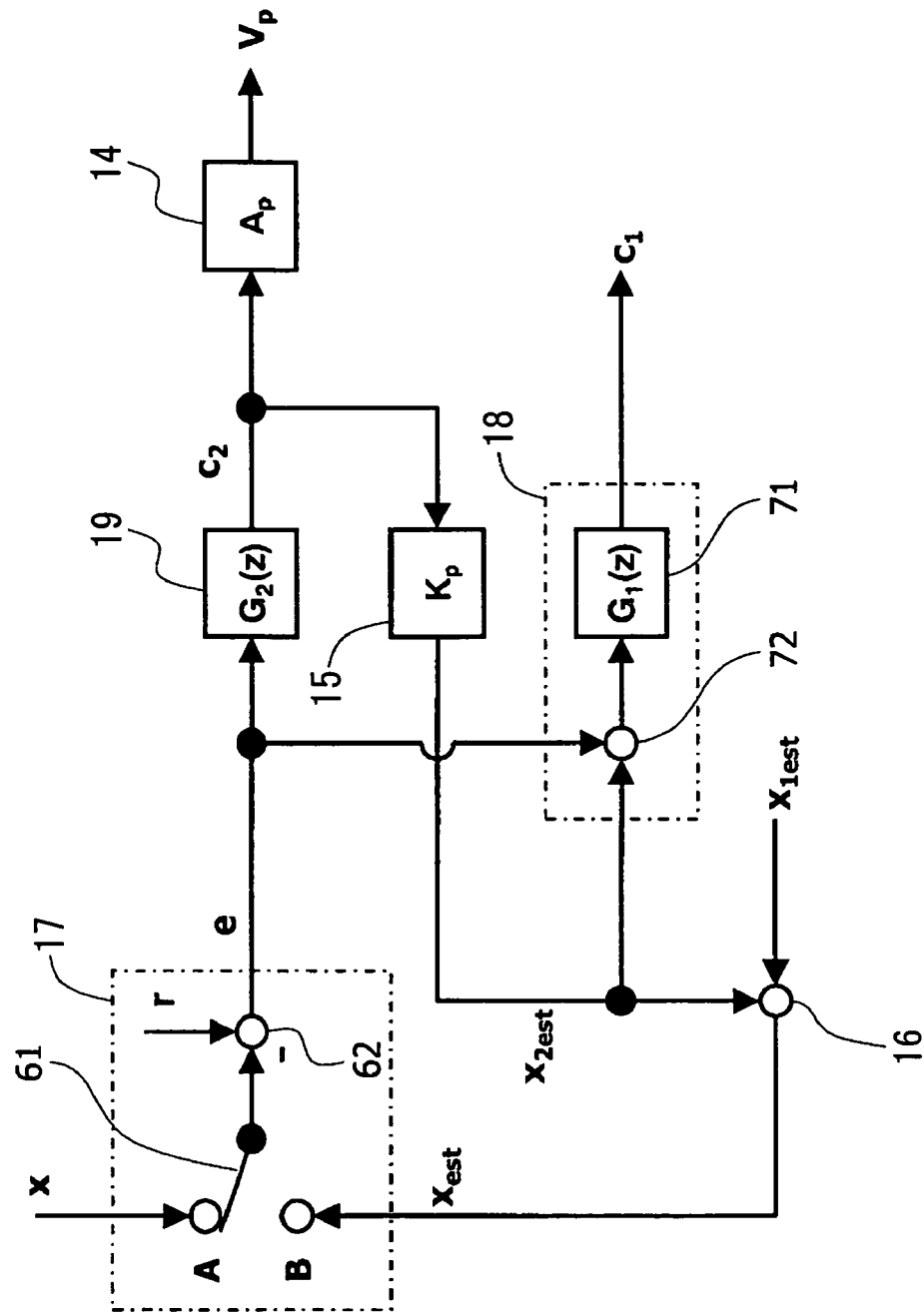
FIG. 4 is a block diagram showing another part of the structure of the positioning system according to an embodiment of the present invention.

FIG. 4 is a block diagram showing another part of the structure of the positioning system in the magnetic disk apparatus of the present embodiment, illustrating the second driver 14, the second estimator 15, the adder 16, the position error detector 17, the first controller 18 and the second controller 19.

In FIG. 4, the second driver 14 represented by a block of the transfer function Ap multiplies the fine adjustment actuator control signal $c_2$ output from the second controller 19 by Ap to output the driving voltage Vp for the fine adjustment actuator 7.

The second estimator 15 represented by a block of the transfer function Kp estimates a displacement of the magnetic head 2a which occurs when the driving voltage Vp is input to the fine adjustment actuator 7, so as to output the displacement estimation signal $x_{2est}$. In the present embodiment, the fine adjustment actuator 7 is formed by a thin film piezoelectric element having characteristics that cause a displacement generally proportional to the applied voltage. Thus, it is understood that the driving voltage Vp is generally proportional to a displacement of the magnetic head 2a which occurs when the driving voltage Vp is applied to the fine adjustment actuator 7. Therefore, the fine adjustment actuator control signal $c_2$ output from the second controller 19 is multiplied by Kp to generate the displacement estimation signal $x_{2est}$.

The adder 16 adds together the first head position estimation signal $x_{1est}$ output from the first estimator 13 and the displacement estimation signal $x_{2est}$ output from the second estimator 15 so as to output the second head position estimation signal $x_{est}$.

A one-dot-chain-line block on the upper left in FIG. 4 corresponds to the position error detector 17 of FIG. 1. The position error detector 17 is formed by a switch 61 and a subtractor 62. The position signal x of the magnetic head 2a is input to the switch 61 at a terminal A. The position signal x is detected by reading, with the magnetic head 2a, the servo information recorded on the magnetic disk 1 in advance at a predetermined angular interval. On the other hand, the second head position estimation signal $x_{est}$ output from the adder 16 is input to the switch 61 at a terminal B. The subtractor 62 subtracts the position signal x or the second head position estimation signal $x_{est}$ from a target position signal r for the magnetic head 2a, so as to generate the position error signal e.

A one-dot-chain-line block on the lower center in FIG. 4 corresponds to the first controller 18 of FIG. 1. The position error signal e and the displacement estimation signal $x_{2est}$ are added together by an adder 72, and a resultant addition signal is input to a block 71. The block 71 subjects the addition signal to digital filter processing of the transfer function $G_1(z)$ to generate the voice coil motor control signal $c_1$. The transfer function $G_1(z)$ is expressed by Expression (21).

$$G_1(z) = K_1\left[1 + h_1(1 - z^{-1}) + L_1 \frac{z^{-1}}{1 - z^{-1}}\right] \quad (21)$$

In this expression, $z^{-1}$ denotes a one-sample delay, and $K_1$ denotes the proportional gain. The coefficients $h_1$ and $L_1$ are constants representing frequency characteristics, $h_1$ being a differential coefficient and $L_1$ being an integral coefficient.

The second controller 19 subjects the position error signal e to digital filter processing of the transfer function $G_2(z)$ as in the first controller 18, so as to output the fine adjustment actuator control signal $c_2$. The transfer function $G_2(z)$ is expressed by Expression (22).

$$G_2(z) = K_2\left[\frac{z^{-1}}{1 - z^{-1}}\right] \quad (22)$$

In this expression, $K_2$ denotes the proportional gain.

Figure 5A:
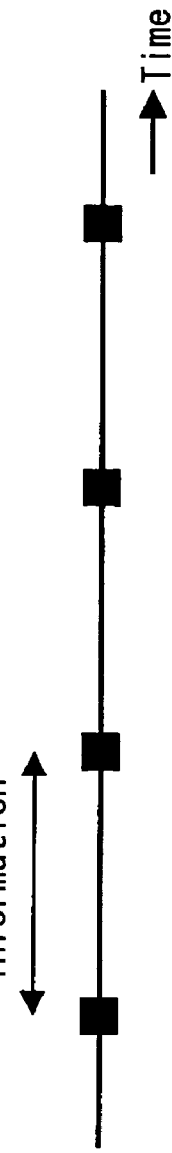
FIG. 5A through FIG. 5C illustrate an example of the operation of a position error detector according to an embodiment of the present invention.
Figure 5B:
Figure 5C:
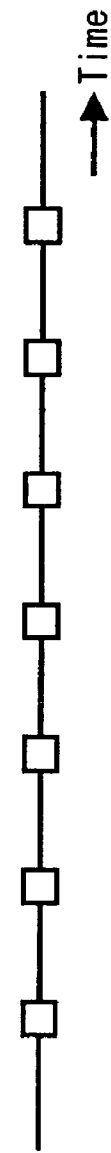

FIG. 5A through FIG. 5C illustrate an exemplary operation of the switch 61 which is performed when the position error signal e is generated in the position error detector 17. FIG. 5A is a chart illustrating the timing at which the servo information recorded on the magnetic disk 1 is read by the magnetic head 2a at a predetermined sampling cycle to generate the position signal x. A solid box ■ indicates the time when the position signal x is generated. FIG. 5B is a chart which illustrates the cycles when the switch 61 is connected to the terminal A or the terminal B. At the time when the servo information can be sampled, the magnetic head 2a can read the servo information to generate the position signal x. Therefore, at such a time, the switch 61 is connected to the terminal A so that the position error detector 17 generates the position error signal e using the position signal x. On the other hand, at the time when the servo information cannot be sampled, it is not possible to generate the position signal x. Therefore, the switch 61 is connected to the terminal B so that the position error detector 17 generates the position error signal e using the second head position estimation signal $x_{est}$. In the example illustrated in FIG. 5, the cycle of switching between the terminal A and the terminal B is a ½ of the sampling cycle of the servo information. That is, the position error signal e is generated at a cycle that is a ½ of the sampling cycle of the servo information.

As described above, the first head position estimation signal $x_{1est}$ is obtained by integrating the velocity estimation signal $v_{est}$ for the magnetic head 2a in the first estimator 13. The first head position estimation signal $x_{1est}$ is an estimation result for the position of the magnetic head 2a which has been displaced due to the driving of the voice coil motor 6. Assuming that the position $x_0$ of the magnetic head 2a at a certain time $t_0$ has been precisely determined by detecting the servo information, the first head position estimation signal $x_{1est}$ at time $t_0+\Delta t$ is expressed using the velocity estimation signal $V_{est}$ as Expression (23).

$$x_{1est}(t_0 + \Delta t) = x_0 + \int_{t_0}^{t_0+\Delta t} v_{est} dt \quad (23)$$

In this expression, $\Delta t$ denotes the cycle of switching the switch 61 between the terminal A and the terminal B. Every time the first head position estimation signal $x_{1est}$ is generated, a correction is made to the first head position estimation signal $x_{1est}$ while referring to the correct and latest magnetic head position detected by sampling the servo information (i.e., position $x_0$). That is, the first head position estimation signal $x_{1est}$ is sequentially corrected using the servo information, such that the generated first head position estimation signal $x_{1est}$ is always correct.

The displacement estimation signal $x_{2est}$ for the fine adjustment actuator 7 is generated by multiplying the fine adjustment actuator control signal $c_2$, which is a second control signal required for driving the fine adjustment actuator 7, by the transfer function Kp in the second estimator 15. This is achieved by utilizing the characteristic of the thin film piezoelectric element which is a constituent of the fine adjustment actuator 7 such that the piezoelectric element causes a displacement generally proportional to the voltage applied thereto.

Thus, the second head position estimation signal $x_{est}$, which is generated by adding together the first head position estimation signal $x_{1est}$ and the displacement estimation signal $x_{2est}$ by the adder 16, is a correct estimation result for the position of the magnetic head 2a. Even when the switch 61 is connected to the terminal B, it is possible to generate the correct position error signal e.

The voice coil motor control signal $c_1$ and the fine adjustment actuator control signal $c_2$ are generated from the position error signal e by the first controller 18 and the second controller 19, respectively. In the example illustrated in FIG. 5A through FIG. 5C, the position error signal e is generated at a cycle that is a ½ of the sampling cycle of the servo information, and accordingly, the voice coil motor control signal $c_1$ and the fine adjustment actuator control signal $c_2$ are also generated at a cycle that is a ½ of the sampling cycle of the servo information. FIG. 5C is a chart illustrating the timings when the voice coil motor control signal $c_1$ and the fine adjustment actuator control signal $c_2$ are generated. An open box □ indicates the time when the voice coil motor control signal $c_1$ and the fine adjustment actuator control signal $c_2$ are generated.

As shown in the timing chart of FIG. 5A through FIG. 5C, according to the present embodiment, at the time when the head position signal x cannot be detected by reading the servo information with the magnetic head 2a, the position error signal e is generated using the second head position estimation signal $x_{est}$ which indicates the estimated position of the magnetic head 2a. That is, it is possible to generate the position error signal e without directly using the servo information. Thus, the generation cycle of the position error signal e is shortened such that the control frequency of the positioning system is increased without increasing the number of servo sectors, i.e., without decreasing the data format efficiency. As a result, precise positioning of the magnetic head is achieved, and a highly reliable magnetic disk apparatus is provided.

The second head position estimation signal $x_{est}$ is obtained by adding together the first head position estimation signal $x_{1est}$ generated by the first estimator 13 and the displacement estimation signal $x_{2est}$ generated by the second estimator 15. The first estimator 13 generates the first head position estimation signal $x_{1est}$ based on the voice coil motor driving signal $u_1$ and the voltage signal Va detected by the voltage detector 12. The second estimator 15 generates the displacement estimation signal $x_{2est}$ based on the fine adjustment actuator control signal $c_2$. Basically, these signals can be generated independently of the sampling cycle of the servo information. Thus, as seen in the example of FIG. 5, the generation frequency of the position error signal e is not limited to a ½ of the sampling cycle of the servo information. The position error signal e may be generated at a shorter cycle.

In the present embodiment, the multipliers, adders, subtractors and integrators included in the first estimator 13 and the disturbance compensator 10 are formed by analog filters, but the present invention is not limited thereto. It is a matter of course that the same effects are obtained even when these elements are formed by digital filters. The present embodiment has been described while exemplifying a magnetic disk apparatus, but the present invention is not limited thereto. It is a matter of course that the present invention is applicable to an optical disk apparatus, a magneto-optical disk, and the like.

In the above embodiment, the piezoelectric element that constitutes the fine adjustment actuator 7 causes a displacement generally proportional to the applied voltage, but the present invention is not limited thereto. The piezoelectric element that constitutes the fine adjustment actuator 7 may only have a certain relationship between the applied voltage and the displacement.

The fine adjustment actuator 7 is not limited to an actuator including a piezoelectric element. As a matter of course, any other type of actuator may be used as the fine adjustment actuator 7 (see, for example, "A MEMS Piggyback Actuator for Hard-Disk Drives", JOURNAL OF MICROELECTRO-MECHANICAL SYSTEMS, VOL. 11, NO. 6, pp 648–654, DECEMBER 2002, "An Electrostatic Micro Actuator for a Magnetic Head Tracking System of Hard Disk Drives.", TRANSDUCERS '97, 1997 International Conference on Solid-State Sensors and Actuators, Chicago, Jun. 16–19, 1997, pp 1081–1084).

What is claimed is:

1. A head positioning method for positioning a head with respect to a rotating disk by using an actuator, the actuator including a general adjustment actuator which has a voice coil motor and has a stroke covering the entire disk and a fine adjustment actuator which is interposed between the general adjustment actuator and the head and has a stroke smaller that that of the general adjustment actuator, the method comprising the steps of:

generating a first driving signal for driving the general adjustment actuator and a second driving signal for driving the fine adjustment actuator;

detecting a voltage generated in the voice coil motor due to the driving of the general adjustment actuator to generate a voltage signal which indicates the detected voltage value;

estimating the position of the head displaced due to the driving of the general adjustment actuator based on the first driving signal and the voltage signal to generate a first head position estimation signal;

estimating a displacement of the fine adjustment actuator based on the second driving signal to generate a displacement estimation signal;

adding together the first head position estimation signal and the displacement estimation signal to generate a second head position estimation signal;

generating from a target position signal which indicates a target position of the head and the second head position estimation signal, a position error estimation signal which indicates an error of the head with respect to the target position; and correcting the first driving signal and the second driving signal based on the position error estimation signal.

2. The head positioning method of claim 1, further comprising the steps of:

detecting the position of the head by reproducing, with the head, servo information recorded in advance on the disk; and generating a position error signal which indicates an error of the head with respect to the target position based on the detected head position and the target position;

wherein the method includes, in place of the driving signal correction step, a correction step of correcting the first driving signal and the second driving signal selectively using one of the position error signal and the position error estimation signal.

3. The head positioning method of claim 2, wherein:

the correction step is performed at a predetermined cycle that is shorter than a sampling cycle of the servo information;

in a period during which the servo information is reproduced with the head, the position error signal is used; and in a period during which the servo information is not reproduced with the head, the position error estimation signal is used.

4. The head positioning method of claim 1, further comprising the steps of:

estimating the magnitude of disturbance acting on the general adjustment actuator based on the first driving signal and the voltage signal to generate a disturbance estimation signal; and generating from the disturbance estimation signal a disturbance compensation signal which compensates for disturbance and synthesizing the first driving signal and the disturbance compensation signal to correct the first driving signal.

5. The head positioning method of claim 1, further comprising the steps of:

sequentially detecting the position of the head by reproducing, with the head, servo information recorded in advance on the disk; and after detecting the position of the head, sequentially correcting the first head position estimation signal based on the detected head position.

6. The head positioning method of claim 1, wherein the fine adjustment actuator is formed by a piezoelectric element.

7. The head positioning method of claim 6, wherein the piezoelectric element has a characteristic that causes a displacement generally proportional to the second driving signal.

8. A disk apparatus, comprising:

a disk on which information is recorded;

a motor for rotating the disk;

a head for at least reproducing the information on the disk;

a head supporting mechanism including a general adjustment actuator which has a voice coil motor and has a stroke covering the entire disk and a fine adjustment actuator which is interposed between the general adjustment actuator and the head and has a stroke smaller that that of the general adjustment actuator;

a controller for generating a first driving signal and a second driving signal;

a first driver for driving the general adjustment actuator according to the first driving signal;

a second driver for driving the fine adjustment actuator according to the second driving signal;

a voltage detector for detecting a voltage generated in the voice coil motor due to the driving of the general adjustment actuator to output a voltage signal which indicates the detected voltage value;

a first estimator for estimating the position of the head displaced due to the driving of the general adjustment actuator based on the first driving signal and the voltage signal to output a first head position estimation signal;

a second estimator for estimating a displacement of the fine adjustment actuator based on the second driving signal to output a displacement estimation signal;

an adder for adding together the first head position estimation signal and the displacement estimation signal to output a second head position estimation signal; and a position error-related signal generator for generating from a target position signal which indicates a target position of the head and the second head position estimation signal, a position error estimation signal which indicates an error of the head with respect to the target position, wherein the controller corrects the first driving signal and the second driving signal based on the position error estimation signal.

9. The disk apparatus of claim 8, wherein:

the position error-related signal generator generates a position error signal which indicates an error of the head with respect to the target position by reproducing, with the head, servo information recorded in advance on the disk; and the controller corrects the first driving signal and the second driving signal selectively using one of the position error estimation signal and the position error signal.

10. The disk apparatus of claim 9, wherein:

the controller corrects the first driving signal and the second driving signal at a predetermined cycle that is shorter than a sampling cycle of the servo information;

in a period during which the servo information is reproduced with the head, the position error signal is used; and in a period during which the servo information is not reproduced with the head, the position error estimation signal is used.

11. The disk apparatus of claim 8, further comprising a disturbance compensator for synthesizing a disturbance compensation signal which indicates an estimated magnitude of disturbance acting on the general adjustment actuator with the first driving signal to generate a disturbance-compensated first driving signal, wherein the first estimator estimates the magnitude of the disturbance acting on the general adjustment actuator based on the disturbance-compensated first driving signal and the voltage signal to generate the disturbance compensation signal.

12. The disk apparatus of claim 8, wherein the first estimator sequentially corrects the first head position estimation signal based on the detected head position that is obtained by reproducing the servo information with the head.

13. The disk apparatus of claim 8, wherein the fine adjustment actuator is formed by a piezoelectric element.

14. The disk apparatus of claim 13, wherein the piezoelectric element has a characteristic that causes a displacement generally proportional to the second driving signal.

* * * * *